United States Patent [19]
Eberhardt et al.

[11] 3,791,016
[45] Feb. 12, 1974

[54] METHOD OF CREATING MOTION-FREE CONNECTION

[75] Inventors: George J. Eberhardt, Dayton, Ohio; Gilbert Kennedy, deceased, late of Dayton, Ohio by Dorothy L. Kennedy, executrix

[73] Assignee: The National Cash Register Company, Dayton, Ohio

[22] Filed: Oct. 22, 1971

[21] Appl. No.: 191,593

Related U.S. Application Data
[63] Continuation-in-part of Ser. No. 812,777, April 2, 1969, abandoned.

[52] U.S. Cl..................... 29/432, 29/21.1, 29/521, 113/1 N, 113/116 FF
[51] Int. Cl.............................................. B23p 11/00
[58] Field of Search 29/21.1, 521, 432; 113/116 FF, 113/1 N

[56] References Cited
UNITED STATES PATENTS

| | | | |
|---|---|---|---|
| 1,446,095 | 2/1923 | Karaus | 29/432 UX |
| 2,275,438 | 3/1942 | Hathersall | 29/432 |
| 2,441,181 | 5/1948 | Bartelheim | 113/116 FF UX |
| 2,713,197 | 7/1955 | Schmidt | 29/432 |
| 3,216,758 | 11/1965 | Bohlen | 29/432 X |
| 3,217,398 | 11/1965 | Prestige | 29/432 |
| 3,276,112 | 10/1966 | Tantlinger et al. | 29/432 |
| 3,357,081 | 12/1967 | Prestige | 29/432 X |

*Primary Examiner*—Charlie T. Moon
*Attorney, Agent, or Firm*—J. T. Cavender; Wilbert Hawk, Jr.; George J. Muckenthaler

[57] ABSTRACT

A single-step method of creating, and apparatus for so creating, a motion-free connection of two members by reason of partially piercing one member wherein material from the one member is forced into and through the second member. The material being displaced from the one member creates an opening in the second member by removing a slug therefrom, and the displaced material assumes a shape to fill the opening, a portion of the material forced into and through the second member being flared outwardly, by reason of spring action in clamping around the portion, and thus form a mechanical bond to secure the two members. The connection provides complete bonding, by shearless flow of material, to resist separation of one member from the other, as well as torsional resistance to rotation between the two members.

13 Claims, 6 Drawing Figures

Patented Feb. 12, 1974
3,791,016
2 Sheets-Sheet 1
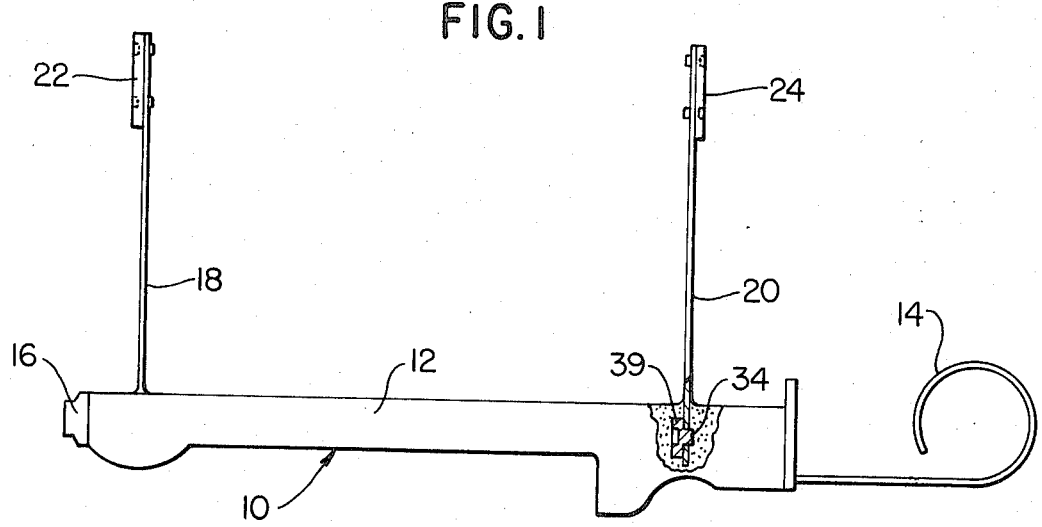
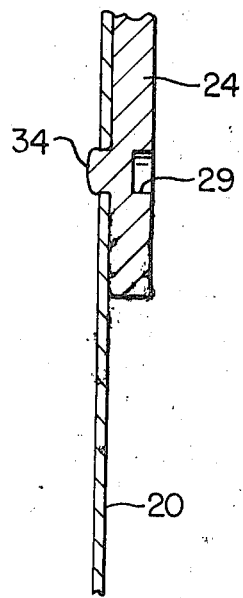
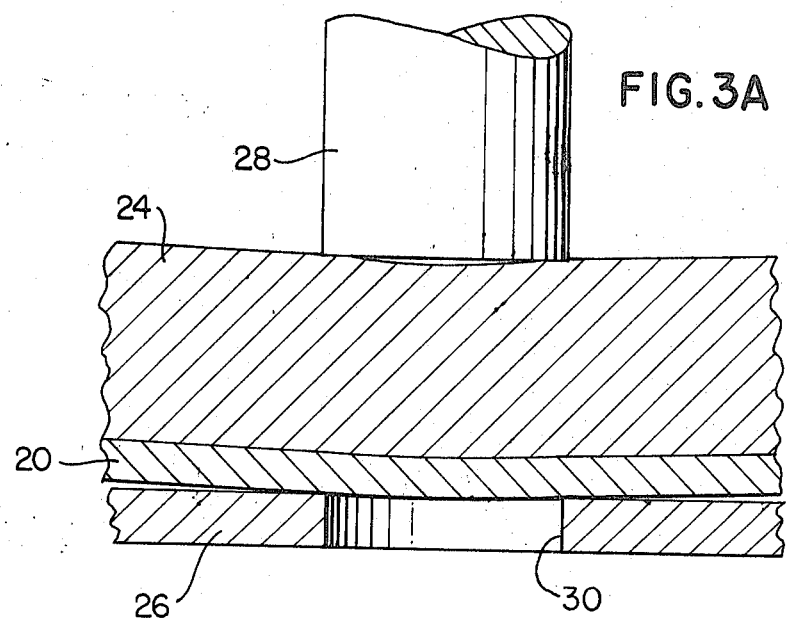

METHOD OF CREATING MOTION-FREE CONNECTION

CROSS-REFERENCE TO RELATED APPLICATION

This is a continuation-in-part of application Ser. No. 812,777, filed Apr. 2, 1969, now abandoned.

BACKGROUND OF THE INVENTION

In recent years, there has been a upsurge in highly complicated equipment being placed on the market, the general trend being that demands are imposed on such equipment which require that it be packaged within smaller limits and operated at higher speeds. As a result of these demands, improvements are being made in the design, manufacture, and assembly of the parts which go into this equipment for longer and maintenance-free service at these higher speeds.

In the basic concept of securely connecting two or more pieces or members to operate as an integral part, bolts, rivets, adhesives, and the like have been used to accomplish this specific purpose. However, the fitting together of two metal parts may require that a separate connecting element or material is not desirable, so an alternate method, such as a fusion or welding process, is customarily used. Recently, there have been devised various methods which provide for connecting or fastening together pieces or members without the use of such separate connecting element or material.

Suggestive prior art for accomplishing the latter mentioned methods, such as U.S. Pat. No. 2,713,197, issued July 19, 1955, on the appliation of Ottmar E. Schmidt, shows a method and apparatus for making an integral rivet connection where, in the first step, a hollow projection is formed on one thickness, and, as it is being formed, it forces a slug out of a juxtaposed thickness and enters the hole left thereby. In the second step of the process, the end of the projection is upset to rivet the thicknesses together. This process utilizes tools or die sets to remove the material and to form the connection in the two-step operation. Another example of the prior art is U.S. Pat. No. 3,130,489, issued Apr. 28, 1964, on the application of Ernest L. Schlage, which shows a plurality of methods of fastening pieces of metal together by use of punch and die members and performing several operations or steps including the shearing of one of the pieces. While these methods of making connections appear to be satisfactory, for the intended purposes, they do require costly tools and are time-consuming in performing a multiple-step operation.

SUMMARY OF THE INVENTION

The present invention relates generally to the connection of mechanical parts for the typing section of printing apparatus and more particularly to a method of joining together two of the pieces used in the print hammer assembly of a high-speed printer. Although a plurality of these print hammer assemblies are commonly grouped together, it is deemed sufficient to show and describe only a single assembly to understand the teaching of the invention.

In a high-speed printer of the type for which parts joined together by the method of the present invention are readily applicable, a series of print hammer assemblies are utilized to make up the typing section of the printer, where each hammer assembly includes a hammer supported from cantilever-type springs, the springs being substantially normal to the longitudinal axis of the hammer body. In this aspect of the description of the typing section, a plurality of hammers are group-suspended, so that each spring must be capable of being responsive to the striking force of the associated hammer itself, and also it must sustain any reaction forces from adjacent hammers by reason of the grouped arrangement.

Each hammer spring carries a block element at one end thereof and fixed thereto, for perfecting the motion-free connection which is of prime importance in a hammer assembly and which is the essence of the present invention. The block element is secured near the one end of the hammer spring and provides an enlarged volume of material inside the body of the hammer for greater surface area contact to retain the spring in its proper position when it is molded or otherwise affixed within the body. The grouping of the hammer assemblies is accomplished by means of a plate connected to the springs at the end opposite the block element and suspendingly supporting them near one end of the hammer body, and also by means of another plate connected to and supporting springs near the other end of the body.

Since the manner and mode of connecting and securing the block and the plate to each hammer spring are so important as to insure against loosening or separation of the parts during high-speed operations, the present invention shows and describes a method of and apparatus for partially piercing one of the members and moving the displaced portion into and through the other member to provide a trouble-free connection. The method for accomplishing the connection of these two parts requires only a single-step operation wherein an advancing punch or press displaces a portion of the material of the one member (located adjacent the other member) into and through an opening created in the other member by the displaced material, the material removed from the other member assuming the shape of a slug falling freely therefrom, and the displaced material from the first-mentioned member filling the opening in manner and form to permanently secure the two pieces. The two members are thereby affixed to each other and, in effect, become an integral part by reason of the flow of material from the one member into and through the other member.

A second embodiment of the invention is also shown and described, wherein more than two pieces or members are secured by the single-step method.

In view of the above discussion, the principal object of the present invention is to provide an improved and less costly method of joining two pieces of material.

Another object of the present invention is to provide means for creating a motion-free connection of the two pieces in a single-step operation.

A further object of the present invention is to provide a single-step method and apparatus for joining two pieces by partially piercing one piece to displace a portion of material therefrom and driving it into and through the second piece.

An additional object of the present invention is to provide apparatus for the making of a secured connection between one piece and a second piece in accordance with the single-step operation.

Additional advantages and features of the present invention will become apparent and fully understood from a reading of the following description taken together with the annexed drawings, in which:

FIG. 1 is a side view of a hammer assembly used on a high-speed printing machine and incorporating parts connected in accordance with the teaching of the present invention;

FIG. 2 is an enlarged view showing an upper portion of the hammer spring and the plate of FIG. 1, the parts being secured by the single-step operation;

FIG. 3A is a further enlarged view showing the apparatus in initial operation in the manner of making the motion-free connection by means of the present invention;

Figure 3B:
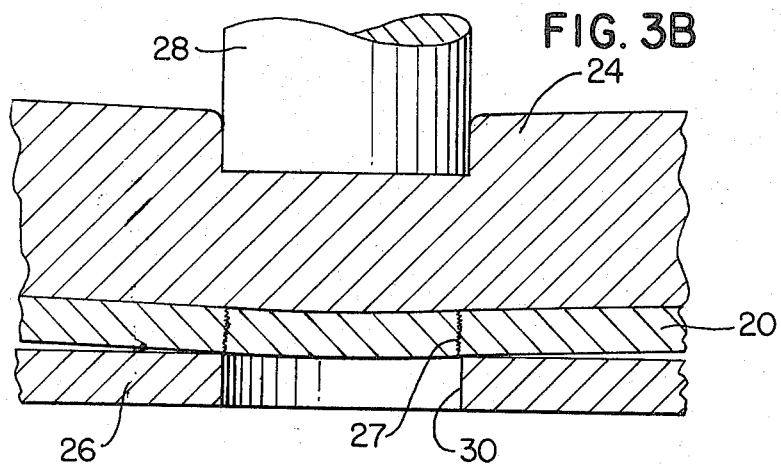
FIG. 3B is a similar view showing the apparatus in further operation in the manner of making the motion-free connection.

Referring to FIG. 1, there is shown a hammer assembly, generally designated as 10, the assembly including a central body portion 12, an anti-rebound spring 14 secured to one end of the body portion, an impact head 16, and resilient members or hammer springs 18 and 20. In a printing machine for which this particular type of hammer assembly is useful, there are usually a plurality of these assemblies in side-by-side relationship and held suspended in groups of, say, four or more by means of support members or plates 22 and 24. One phase of this application deals with and covers a method of attaching and secured the plate 22/24 to the spring 18/20 to insure a motion-free connection in the hammer suspension system, thereby preventing failure of the parts which carry the hammer in its repetitious fore-and-aft motion, involving millions of operations. Likewise, the invention covers the making of a secure connection of the spring 18/20 to a block element at the spring end opposite the plate 22/24, the connection then being located within the hammer body 12.

As mentioned above, there have been various ways and means for attaching or securing each of these two parts, including the use of adhesives, fusion of metal, etc.; however, one cannot be sure, with these methods, that all of the connections will remain secure during the higher speeds of operation which are common today. It is particularly important, of course, that the parts do not separate from each other and also that there is no rotation between the parts at the connection, which would allow a hammer assembly to swing or be driven out of line and cause excessive wearing of the parts, a jammed condition, or breakage of the parts.

Figure 3C:
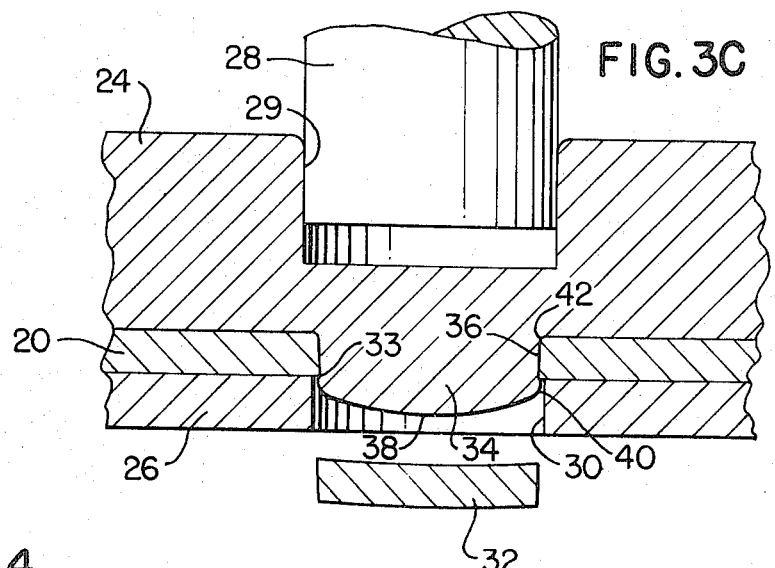
FIG. 3C is a similar view showing the apparatus in a completed operation.

FIG. 2 shows an enlargement of the upper rear portion of the hammer assembly of FIG. 1, the member 24 being securely connected to the spring 20 by application of the single-step method shown and described herein, and FIGS. 3A, 3B, and 3C show a further enlargement of the configuration taken by the several parts 24 and 20 in using the method of the present invention. Since the method of making a motion-free connection utilizes a combination punching and extruding, or partial piercing, operation, a structure having a rigid member 26 supports the hammer spring 20, and the plate 24 is positioned above the spring for engagement by a round punch 28. The support member 26 includes an aperture 30, smaller in diameter than the diameter of the punch, for permitting the flow of material being moved by the punch in its partial piercing operation to remove a slug from the spring 20, but the aperture is sufficiently large in diameter to allow the slug to fall freely therethrough.

FIG. 3A shows the position of the several parts just after the initial contact of the punch 28 with the plate 24, it being observed that both the plate 24 and the spring piece 20 are subjected to sufficient force from the punch to slightly curve or deflect the pieces from a flat condition on support member 26. The amount of curvature is determined by the mechanical properties of the pieces 20 and 24, the relative dimensions of these parts, and the size of the punch in relation to the apparatus 30. In this regard, it is reasoned that the spring piece 20 has a higher hardness number than the plate 24, it being determined that the strength level between the two materials is approximately three to one. Additionally, the plate 24 is a stainless steel having a certain amount of ductility, however, the spring piece 20 is made of a steel that is drawn, rolled, and tempered to a very hard condition to realize the removal of a portion therefrom under the forces exerted by the punch in moving the plate 24 material thereunder in a shearless flow-of-material manner. In effect, the plate 24 material under the punch 28 acts as a punch in itself in the operation of creating the connection between the parts.

FIG. 3B shows the punch 28 in a further advanced position wherein the spring piece 20 and the plate 24 are in the curved or deflected condition, and the force exerted by the punch into the material thereunder is sufficient to fracture the spring piece prior to removing a portion therefrom. The line of fracture 27 is substantially parallel with the side of aperture 30 so that, in the deflected condition, a portion removed from spring piece 20 can freely pass through aperture 30 in support member 26.

FIG. 3C shows the position of the various parts at the conclusion of the single-step operation wherein the punch 28 has descended to a depth approximately half way through the plate 24, thereby creating a circular recess or depression 29 in the member, the material under the punch being displaced downwardly to force a slug 32 out of the spring piece 20, the slug dropping through the support member aperture 30, and the downwardly-displaced material of the plate 24 being forcibly extruded into and through an opening 36 in the spring 20 created by the departing slug 32. Of course, in the actual punching operation, a portion 34 of the plate 24 does not separate contact with the slug 32 until the slug drops freely from its parent part 20. The view in FIG. 3C is taken from an actual photograph magnified sufficiently to show the flow of the metal material under and in the immediate vicinity of the punch 28 as it descends into the member 24, the material being displaced under the force of the punch to remove the slug 32 from the spring 20, and the displaced material being moved into and through the opening 36 created therein. In this view, however, the punch 28 is shown as being retracted upwardly to release the forces on the plate 24 and the piece 20 and thus allow the pieces to return to a flat condition on the support plate 26. Additionally, the extent of curvature or deflection of the pieces, particularly the piece 20 and the slug 32, is shown exaggerated to indicate the action of the parts during the operation.

It is noted that the diameter of the punch 28 is greater than the diameter of the aperture 30 in the rigid support member 26 to force the metal to flow into the opening 36 left by the departing slug 32, and also to curve the metal in a fashion to completely fill the opening and to measurably extend the displaced material portion 24 beyond the confines of the spring 20 and undermine the edges of the spring at the opening 36.

As mentioned above, the plate 24 is considered to be ductile as compared to piece 20, and piece 20 is tempered to a condition of very high strength. An additional property of the piece 20 features the elasticity or the ability to return to its original position after being deflected therefrom so that the spring piece 20, in effect, springs back to the flat position on the support plate 26 after release of the punch. Because the punch diameter is greater than the diameter of the aperture 30, the material in plate 24 which is beneath the punch is contained thereunder and is not forced outwardly, with the effect that the forces downwardly along the periphery of the punch are greater than the forces directed downwardly near the center of the punch. As the material under the punch flows into the space left by the departing slug 32, the piece 20 springs back to a level position and by reason of the fracture 27 line shown in FIG. 3B being substantially parallel with the aperture 30 when the piece 20 is in the deflected position, and therefore the opening 36 being at a slight angle in relation to the aperture 30 when piece 20 returns to a level position, it is seen that the lower edge 33 of piece 20 adjacent the opening 36 clamps around the material portion 34 that is moved through the opening 36. In this manner, the spring piece 20 bites into the plate material 34 to connect the parts in the manner afforded by the invention.

The dimensions of the punch 28 and of the aperture 30 are selected to be compatible for effecting the desired results, so that, when the portion 34 is forced into and through the piece 20, it assumes a bell-shaped form at the leading surface 38, and is also flared at its sides 40 to undermine the bottom surface of the piece 20. The opening 36 assumes a rounded contour 42 by reason of the respective selected diameters of the punch 28 and the aperture 30, the flow of material being displaced downwardly into and through the piece 20 6ithout shearing any of the metal material of the plate 24. In the matter of representative dimensions of the various parts, for a plate 24 thickness of 0.020 inch and a spring 20 thickness of 0.006 inch, excellent results were obtained with a punch 28 diameter of 0.030 inch and with a support plate 26 aperture 30 diameter of 0.026 inch. The punch travels a distance of 0.013 inch into the plate 24 to provide for the displacement of material in the plate to remove the slug 32 from the spring piece 20, the material flow being of a combined punching and extruding nature to prevent any severing of material in the plate 24. It is essential that the diameter of the punch 28 be larger than the diameter of the aperture 30 in the support plate 26 to force material from the plate 24 to discharge the slug 32 and to cause flow of such plate material into and through the created opening and thus permit the spring piece 20 to form around the plate material in a diameter smaller than the aperture for securing the pieces. It is a springing back of the piece 20 to clamp the plate material 34 and, in effect, extrude the material through the opening 36 to secure the parts. The use of larger dimensions, relatively selected, should produce similar results in the single-step operation. The lug 32 is shown as having slightly curved upper and lower surfaces in the shape as depicted in FIG. 3B just prior to removing it from the piece 20.

Referring back to FIG. 1, a block 39 of plate 24 material is shown connected to the lower end of spring piece 20, the block providing an enlarged volume of material within the body of hammer 12 for greater surface area contact.

Figure 4:
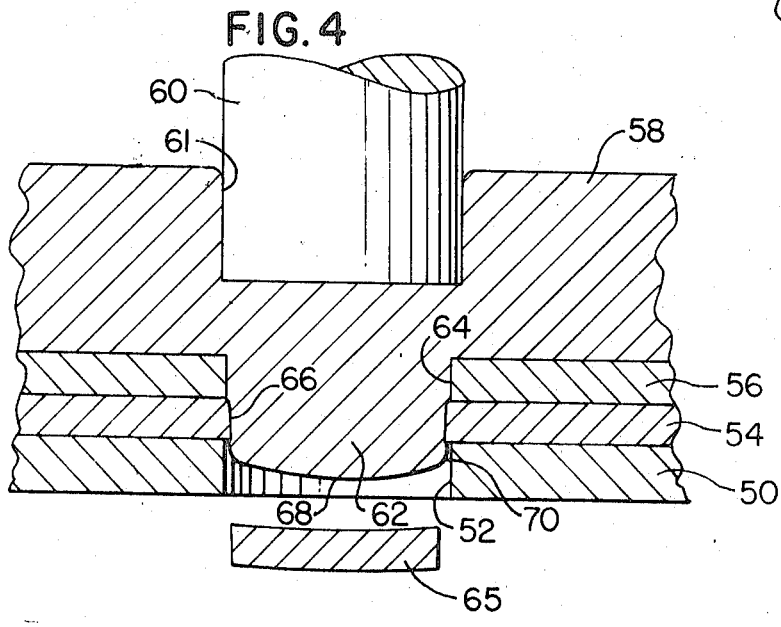
FIG. 4 is a view showing another embodiment of the method of connection in a single-step operation.

Another application of the method of the present invention is shown in FIG. 4, wherein a plurality of pieces are bonded together to form a motion-free connection In this embodiment, a member 50 having an aperture 52 is used to support a plate 54, a centrally-positioned pre-punched piece 56, and a plate 58 above the piece 56. A punch 60 is forced downwardly into the plate 58 a distance approximately half its thickness, thereby creating a depression 61 in the plate 58, and driving a portion 62 of the plate 58 through the aperture 64 in the pre-punched piece 56 to displace a slug 65 from the plate 54, the portion 62 completely filling both the aperture 64 in the piece 56 and the opening 66 created thereby in the plate 54. The portion 62, in its emergence from the opening 66, assumes the bell-shaped surface structure 68 with the flared sides 70 undermining the bottom surface of the plate 54 adjacent the opening 66. The mechanical properties of the various parts (the plate 58 and the spring piece 54) are essentially the same as described above. Of course, the piece 56, having a pre-cut or pre-punched aperture would necessarily have properties similar to those of the piece 54 so as not to be affected by the forces acting thereagainst.

It is thus seen that herein shown and described is a one-step method in the manner of a single, or "one-shot", operation for creating a motion-free connection of two or more pieces by partially piercing one piece, which method includes all the advantages and features mentioned above. While only two embodiments have been disclosed, slight variations on the above may occur to those skilled in the art, so it is contemplated that all such variations having these features are within the scope of the invention.

What is claimed is:

1. A method of connecting adjacent pieces of stock, one of which is a spring piece, by supporting the pieces on a member having an aperture therein, comprising the single step of moving a punch having a diameter greater than that of the aperture for partially piercing one piece and thereby forcing material from the adjacent spring piece, the material from said partially pierced piece replacing the material forced from said adjacent spring piece by material flow, the spring piece forming around the material from said partially pierced piece in a diameter smaller than that of the aperture, and the material from said partially pierced piece extending beyond the confines of said adjacent spring piece in an enlargement greater than the extent of material removed from said adjacent spring piece.

2. A method of joining two pieces of material, one of which is a spring piece, by supporting the pieces on a member having an aperture therein, comprising the single step of moving a punch having a diameter greater than that of the aperture for partially piercing one piece, thereby moving material from said one piece into and through the spring piece to remove material therefrom and to create an opening therein, the material from said one piece flowing into and filling the opening, the spring piece surrounding the material filling the opening in a diameter smaller than that of the aperture, and the material from said one piece extending beyond the confines of said spring piece in an enlargement greater than the opening.

3. A method of joining two pieces of material in accordance with claim 2 wherein the partial piercing creates a circular opening in the spring piece and the enlargement assumes a flared form greater in diameter than that of the opening.

4. A method of bonding two pieces of metal, one of which is a spring piece, by supporting the pieces on a member having an aperture therein, comprising the single step of driving a punch having a diameter greater than that of the aperture partially through one piece to displace material therefrom into and through the spring piece, the displacement of material from said one piece thereby removing material from said spring piece and creating a circular opening therein, the material from said one piece filling the opening by flow of metal therethrough and extending beyond the confines of said opening, the spring piece forming around the material filling the opening in a diameter smaller than that of the aperture by reason of being relieved after creation of said opening, and the material from said one piece flaring out to a diameter greater than that of the opening.

5. A method of bonding together two pieces of metal in accordance with claim 4 wherein the circular opening in the spring piece created by the displacement of material from the one piece decreases in diameter from the initial contact edge to the opposite edge of the material, and the displaced material extending beyond the opposite edge having a diameter greater than the smallest diameter of the opening.

6. A method of bonding a plurality of adjacent pieces together, one of which is a spring piece, by supporting said pieces on a member having an aperture, and wherein another of said pieces includes an aperture therein, comprising the single step of driving a punch having a diameter greater than that of the aperture in the member for partially piercing an initial contact piece to displace and move material therefrom into and through said aperture in said other piece, the displacement of said material creating a circular opening in the spring piece distal from the initial contact piece, thereby removing material entirely from the distal spring piece, the displaced material being forced to flow into and through the aperture in said other piece and into and through the created opening, said spring piece forming around the material displaced into the created opening in a diameter smaller than that of the aperture in said member, and the material displaced through the created opening emerging with a flared portion greater in diameter than the diameter of said created opening to secure the pieces in a motion-free connection.

7. A method of bonding a plurality of adjacent pieces in accordance with claim 6 wherein the displaced material creates an opening of decreasing diameter by reason of the material flow, the material filling the opening and emerging in an enlargement greater than the smallest diameter created in the distal piece.

8. A method of creating a motion-free connection with adjacent pieces of stock supported on a member having an aperture therein, one of the pieces being a spring piece, comprising the single step of moving a punch, having a diameter greater than that of the punch and displacing material thereunder, the moving of the punch and the displacing of the material slightly deflecting the spring piece from a planar position and creating an opening in said spring piece smaller than the aperture in said support member, the spring piece clamping the material displaced through the created opening to secure said pieces.

9. The method of claim 8 wherein said spring piece is composed of a hardened metal for clamping the material displaced through the created opening upon release of the punch.

10. The method of claim 8 wherein the piece adjacent the punch is composed of a ductile metal permitting shearless flow of material into and through the created opening.

11. The method of claim 8 wherein the strength level of the spring piece to the piece adjacent the punch is in a ratio of at least two to one or greater.

12. The method of claim 8 wherein the spring piece is a metal of high strength and low ductility and the piece adjacent the punch is a metal of low strength and high ductility.

13. The method of claim 8 wherein the ductility ratio of the spring piece to the piece adjacent the punch is in the range of thirty to one.

* * * * *

UNITED STATES PATENT OFFICE
CERTIFICATE OF CORRECTION

Patent No. 3,791,016     Dated February 12, 1974

Inventor(s) George J. Eberhardt et al.

It is certified that error appears in the above-identified patent and that said Letters Patent are hereby corrected as shown below:

Column 8, line 23, before "punch" insert the following:

-- aperture, partially through the piece adjacent the --.

Signed and sealed this 29th day of October 1974.

(SEAL)
Attest:

McCOY M. GIBSON JR.
Attesting Officer

C. MARSHALL DANN
Commissioner of Patents